(12) United States Patent
Borgione et al.

(10) Patent No.: US 12,641,021 B2
(45) Date of Patent: May 26, 2026

(54) SYSTEMS AND METHODS FOR NETWORK PACKET TRANSLATION

(71) Applicant: Arista Networks, Inc., Santa Clara, CA (US)

(72) Inventors: Sebastiano Borgione, Bellevue, WA (US); John S G Peach, Berkshire (GB)

(73) Assignee: Arista Networks, Inc., Santa Clara, CA (US)

( * ) Notice: Subject to any disclaimer, the term of this patent is extended or adjusted under 35 U.S.C. 154(b) by 471 days.

(21) Appl. No.: 17/745,502

(22) Filed: May 16, 2022

(65) Prior Publication Data

US 2023/0006928 A1    Jan. 5, 2023

Related U.S. Application Data

(60) Provisional application No. 63/217,880, filed on Jul. 2, 2021.

(51) Int. Cl.
| | |
|---|---|
| *H04L 45/745* | (2022.01) |
| *H04L 12/18* | (2006.01) |
| *H04L 61/2557* | (2022.01) |
| *H04L 69/22* | (2022.01) |

(52) U.S. Cl.
CPC ............ H04L 45/745 (2013.01); H04L 12/18 (2013.01); H04L 61/2557 (2013.01); H04L 69/22 (2013.01)

(58) Field of Classification Search
CPC ... H04L 45/745; H04L 12/18; H04L 61/2557; H04L 69/22; H04L 61/2535; H04L 61/5014; H04L 12/1886; H04L 49/309; H04L 69/08

USPC ......................................................... 370/392
See application file for complete search history.

(56) References Cited

U.S. PATENT DOCUMENTS

| | | | | |
|---|---|---|---|---|
| 7,689,716 | B2 * | 3/2010 | Short et al. ........... | H04L 63/104 |
| | | | | 709/246 |
| 9,210,103 | B1 * | 12/2015 | Safrai ..................... | H04L 49/00 |
| 9,319,351 | B1 * | 4/2016 | Orr et al. ............ | H04L 47/2441 |
| | | | | 370/252 |
| 10,374,972 | B2 * | 8/2019 | Tremblay ................ | H04L 41/12 |
| 10,652,281 | B1 * | 5/2020 | Moolenaar .......... | H04L 63/0236 |
| 2011/0134925 | A1 * | 6/2011 | Safrai et al. .......... | H04L 45/586 |
| | | | | 370/395.53 |
| 2015/0334045 | A1 * | 11/2015 | Tremblay ................ | H04L 41/40 |
| | | | | 709/226 |
| 2021/0044528 | A1 * | 2/2021 | Paduvalli ............ | H04L 47/2441 |

* cited by examiner

*Primary Examiner* — Jae Y Lee
*Assistant Examiner* — Haeshil J Choi
(74) *Attorney, Agent, or Firm* — Sprinkle IP Law Group

(57) ABSTRACT

A method for modifying packet data of a packet in a network device, where the method includes receiving, at an ingress pipeline of the network device, the packet, performing a lookup, in a packet translation ruleset, to compare the packet data to rule criteria of a rule in the packet translation ruleset, making a first determination that at least a portion of the packet data matches the rule criteria, and based on the first determination, adding a packet translation tag to the packet, where the packet translation tag includes a rule action, copying the packet translation tag and a portion of the packet to obtain a copied packet, modifying the copied packet as described in the rule action to obtain a modified copied packet, and forwarding the modified copied packet to an egress pipeline.

20 Claims, 13 Drawing Sheets

Packet Translation Ruleset
560

| | Rule Identifier(s) 564 | Rule Criteria 566 | Rule Action(s) 568 |
|---|---|---|---|
| Rule A 562A | 0 | DST: 192.168.10.105/32 | 1) Change DST to: 192.168.1.105/32 |
| Rule B 562B | SITE_A_2_SITE_B | DST subnet: 192.168.20.0/24 | 1) Change DST subnet to: 192.168.1.0/24 2) Change SRC subnet to: 192.168.10.0/24 |
| Rule C 562C | SITE_B_2_SITE_A | DST subnet: 192.168.10.0/24 | 1) Change DST subnet to: 192.168.1.0/24 2) Change SRC subnet to: 192.168.20.0/24 |
| Rule D 562D | Uni2MultiUni | SRC: 162.32.45.99/32, AND DST: 97.125.25.16/32 | 1) Make two copies<br><br>For copy 1: 2.1) Change DST to: 192.168.10.54<br><br>For copy 2: 3.1) Change SRC to: 100.88.36.2, 3.2) Change DST to: 192.168.10.57 |
| Rule E 562E | UnifiedMulti | DST GRP: 239.55.55.55, OR DST GRP: 240.21.99.2 | 1) Change SRC to 77.10.10.2<br><br>2) Make two copies<br><br>For copy 1: 3.1) Change DST GRP to 239.10.10.2<br><br>For copy 2: 4.1) Change DST GRP to 239.10.10.3 |

FIG. 5

SYSTEMS AND METHODS FOR NETWORK PACKET TRANSLATION

CROSS-REFERENCE TO RELATED APPLICATION(S)

This application claims a benefit of priority under 35 U.S.C. § 119 to Provisional Application No. 63/217,880, filed Jul. 2, 2021, entitled "SYSTEM AND METHOD FOR THE PROVISION OF ADDRESS TRANSLATION AS A UTILITY," which is fully incorporated by reference herein for all purposes.

BACKGROUND

In some network environments, there may be a limited ability to implement certain protocols and policies. Accordingly, there may be difficulty in achieving a desired security practice, network layout, and/or data flow. In such scenarios, it may be advantageous to introduce components that allow for the necessary protocols and policies in order to achieve the desired network.

BRIEF DESCRIPTION OF DRAWINGS

FIG. 5 shows an example of a packet translation ruleset, in accordance with one or more embodiments.

DETAILED DESCRIPTION

Figure 1:
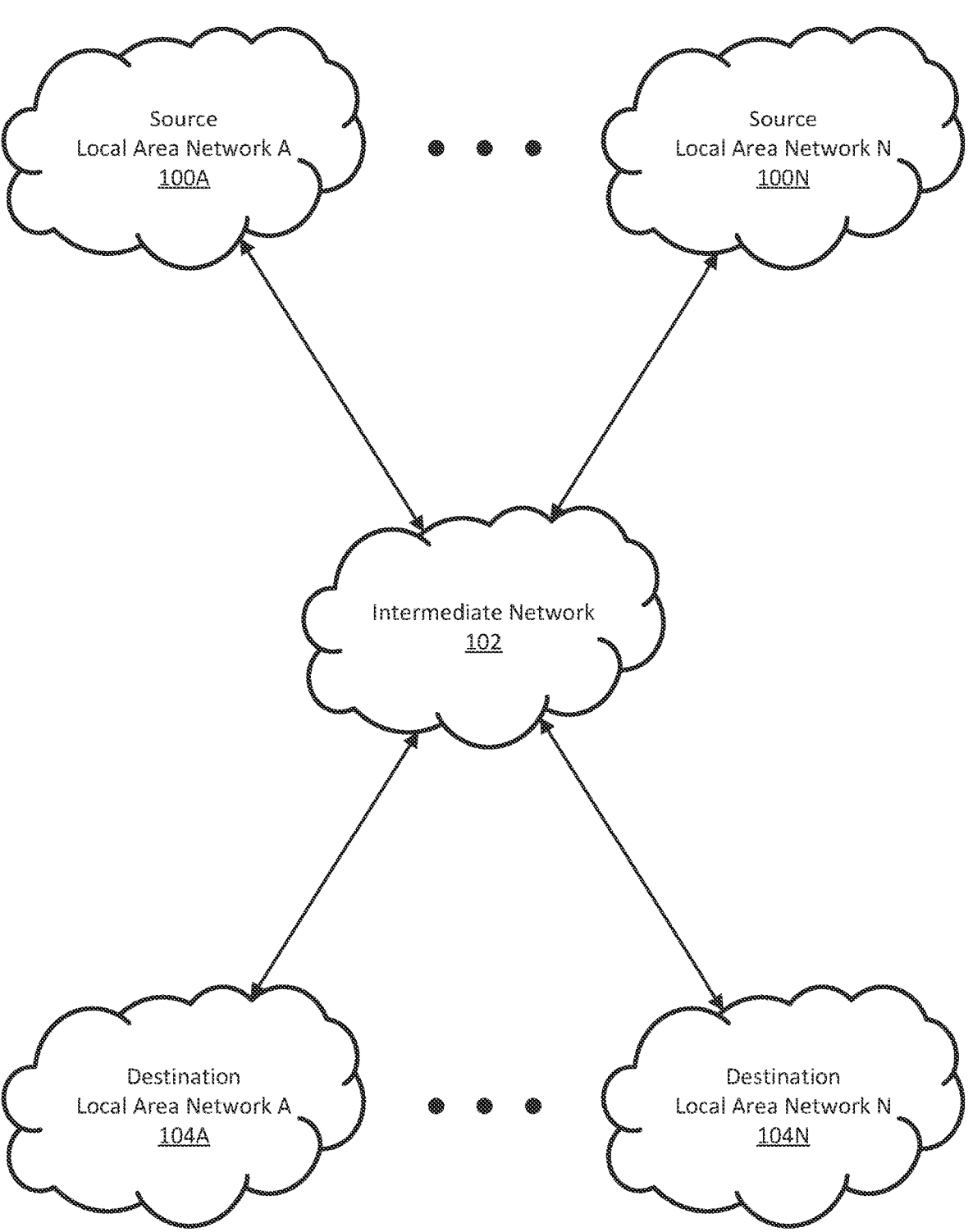
FIG. 1 shows a diagram of various networks, in accordance with one or more embodiments.

While standards exist to facilitate the organized flow of network traffic through networks (and the devices therein), such standards also constrain the abilities of network administrators to implement certain protocols and policies. Such standards may prevent the efficient merging of existing networks—often requiring reconfiguration of one network to match the configuration of the other. An intermediate network, managed by a third party, may disallow the direct routing of certain types of protocols (e.g., multicast over the Internet). Further, existing standards may provide too much transparency of an internal network to a device outside the network—exposing the internal network to potential security breaches.

To solve some of these problems, one or more embodiments disclosed herein provide for a packet translation module that can copy network packets and arbitrarily modify their headers (e.g., internet protocol (IP) addresses, media access control (MAC) addresses, protocols, ports, etc.). Such modifications may ensure that the packet is compatible with an intermediate network, destination network, destination device, or is otherwise modified to provide additional functionalities—without any adherence to traditional network routing rules. Further, the systems and methods disclosed herein provide for modifying network traffic (e.g., using a "stateless" protocol) such that existing systems may route the modified traffic normally (e.g., without identification that the network traffic was modified, requiring no additional configuration of existing systems).

For example, a packet may be changed from unicast to multicast or multicast to unicast. An arbitrary egress port may be chosen for the packet to exit a network device (including the same port from which the packet was received). In addition to the modification of ordinary data packets, 'protocol' packets (that would normally be handled specifically) may be modified as though ordinary data packets. A packet may be copied any number of times—including packets of any variety (e.g., a unicast packet may be copied that, traditionally, would not be copied). Copies of packets may be modified uniquely from other copies (e.g., one copy of a unicast packet may be modified to change the port and be set to multicast, a second copy may be modified to change the destination address, and a third copy may be modified to change the source address and the destination address). That is, any number of copies of a packet may be generated and any number of modifications may be made to each of those copied packets.

Considering the vast capabilities of a packet translation module, there are countless scenarios where such a device may be utilized. As a first example, consider a scenario where a network administrator is tasked with virtually merging two or more existing local area networks (LANs) over the Internet (e.g., via a site-to-site virtual private network (VPN)). It is likely that such networks—independently developed and maintained—will have conflicting policies, overlapping IP addresses, and/or incompatible security features. Often, the solution is to reconfigure each LAN to become compatible with the other. Such changes take time (costing money) and result in other issues arising within the modified network (e.g., those caused by poorly configured client devices, hard-coded devices, incompatible network devices, etc.).

However, using the systems and methods disclosed herein, a network administrator could implement a packet translation module within each network. The packet translation modules could then be configured to allow for seamless communication between devices across each LAN—while only making minor modifications to existing network devices (or no modifications at all).

As a second example, consider a scenario where multiple source devices may be serving content to a destination device (or multiple destination devices). Those destination devices may be able to discern that the content is provided from multiple sources and identify the network in which the source devices reside. Such information may be used by a bad actor to disrupt communications between networks (e.g., attacking one of those sources), allow for the easy identification of additional source devices (e.g., if the known sources follow an identifiable scheme), and generally gain unwanted insight into the interworking of the source devices' network.

To prevent this, using the systems and methods disclosed herein, a network administrator could implement a packet translation module through which all source device content is routed and modified to provide a single external address (different from the address of any source device). Such routing and modifications may be specifically configured to maximize obscurity of the source devices' network and thereby reduce the insight offered to any potential attacker.

Further, by providing a unified external address, source redundancy and load balancing may be achieved without inconvenience to the destination devices. As an example, redundant source devices may be employed within the network to provide a failover mechanism to maintain content integrity. Upon the failure of one or more source device(s), backup source device(s) would begin and continue to serve content to the same packet translation module (as served by the failed source device). Further, destination devices would be un-impacted by the change in source devices as the content from the backup source device is routed through the same packet translation module (from the same external address).

As a third example, consider a scenario where a provider needs to send their content to multiple recipients (e.g., a television studio sending content to multiple broadcasters, a corporate announcement being streamed to multiple company locations, etc.). However, the internal addressing scheme of one or more recipient networks requires a unique configuration in order for the content to be received properly.

In such an instance, a packet translation module may be implemented within the provider's network to ensure a compatible stream of content is provided to each location (where each stream is modified specific to the needs of each recipient network). Alternatively, each recipient network (needing special configuration) may employ their own packet translation module to ensure the provider's content conforms to their internal network. As another alternative, the provider and recipient networks may each employ a packet translation module to perform some part of the needed translation (e.g., the provider may use a packet translation module to provide a more generically compatible stream, and each recipient may employ a packet translation module to perform minor additional configurations as needed).

As a fourth example, consider a scenario similar to the third example, but with multiple providers needing to send content to a single recipient (e.g., multiple television networks providing their respective content to a single cable television provider). In such an instance, the cable television provider may employ one or more packet translation module(s) to modify the content—incoming from each of the providers—to match a single internal scheme of the cable television provider's network. Further, if the recipient utilizes different locations/facilities for receiving the content (with different networks deployed therein), each recipient network may include a packet translation module to modify the content for the particular needs of those networks.

FIG. 1 shows a diagram of various networks, in accordance with one or more embodiments. Specifically, one or more source local area network(s) (e.g., source local area network A (100A), source local area network N (100N)) may be connected to one or more destination local area network(s) (e.g., destination local area network A (104A), destination local area network N (104N)) via an intermediate network (102). Each of these components is described below.

In one or more embodiments, a network is a collection of connected network devices (not shown) that allow for the communication of data from one network device to other computing device(s) (not shown), or the sharing of resources among network devices. Non-limiting examples of a network include a local area network (LAN), a wide area network (WAN) (e.g., the Internet), a mobile network, or any other type of network that allows for the communication of data and sharing of resources among network devices and/or computing devices connected to the network. One of ordinary skill in the art, having the benefit of this detailed description, would appreciate that a network is a collection of connected computing devices that enables communication between those devices.

In one or more embodiments, a source local area network (e.g., source local area network A (100A), source local area network N (100N)) is a network. Further, a source local area network (100A, 100N) may be a local area network which includes one or more source device(s) (not shown). In one or more embodiments, a destination local area network (e.g., destination local area network A (104A), destination local area network N (104N)) is a network. A destination local area network (104A, 104N) may be a local area network which includes one or more destination device(s) (not shown). Although the number of destination local area networks (104A, 104N) and source local area networks (100A, 100N) are shown to be the same, there can be any different number of either type, independent of each other.

In one or more embodiments, an intermediate network (e.g., intermediate network (102)) is a network. An intermediate network (102) may be a local area network or a wide area network (e.g., the Internet) and connects one or more source local area network(s) (100A, 100N) to one or more destination local area network(s) (104A, 104N). Communication between networks (i.e., the devices in those networks) may be accomplished via certain network devices (not shown) that may communicate inside their own network and further be configured to communicate with devices in other networks (i.e., edge network devices). One of ordinary skill in the art, having the benefit of this detailed description, would appreciate the intercommunication of network devices between logically disparate networks.

While FIG. 1 shows a specific configuration of a system, other configurations may be used without departing from the scope. Accordingly, embodiments disclosed herein should not be limited to the configuration of devices and/or components shown in FIG. 1.

Figure 2:
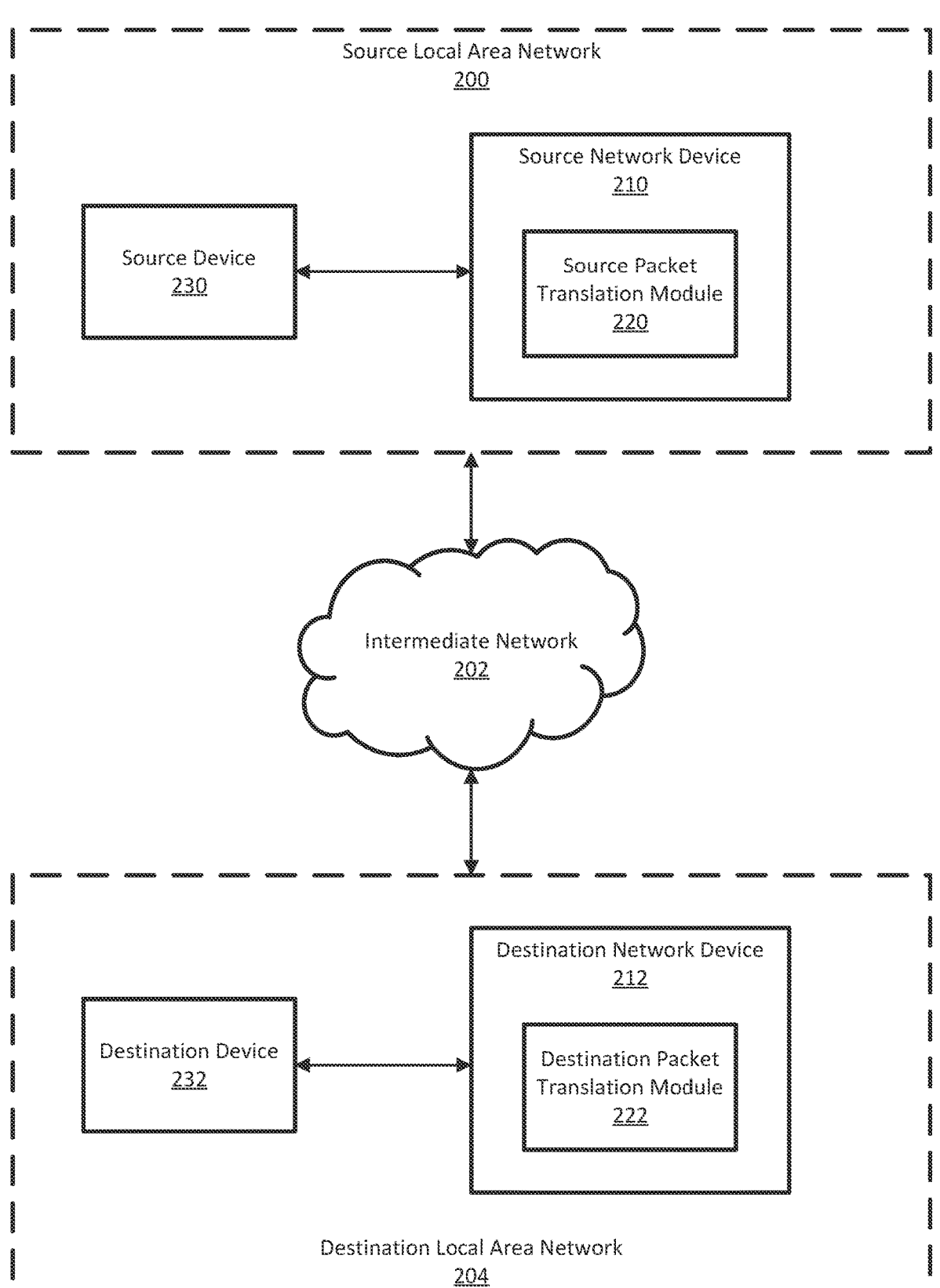
FIG. 2 shows a diagram of various networks with devices therein, in accordance with one or more embodiments.

FIG. 2 shows a diagram of various networks with devices therein, in accordance with one or more embodiments. A source local area network (e.g., source local area network (200)) may include a source device (e.g., source device (230)) and a source network device (e.g., source network device (210)). Similarly, a destination local area network (e.g., destination local area network (204)) may include a destination device (e.g., destination device (232)) and a destination network device (e.g., destination network device (212)). Further, the source local area network (200) and destination local area network (204) may each be connected to an intermediate network (e.g., intermediate network (202)). Similarly named components, shown in this figure, have all of the same properties and functionalities as described in previous figures. Accordingly, only additional components, properties, and functionalities will be described below.

In one or more embodiments, a computing device includes one or more processor(s), memory, persistent storage, input and output device(s), physical interface(s) (e.g., network ports, device peripherals), light emitting diodes (LEDs), optical transceivers, network chips, or any combination thereof. The persistent storage (and/or memory) may store computer instructions (e.g., computer code) which, when executed by the processor(s) of the computing device, cause the computing device to perform one or more processes specified in the computer instructions.

Non-limiting examples of a computing device include a network device (e.g., switch, router, multi-layer switch, etc.), a server (e.g., a blade-server in a blade-server chassis, a rack server in a rack, etc.), a personal computer (e.g., desktop, laptop, tablet, smart phone, personal digital assistant), and/or any other type of computing device with the aforementioned capabilities.

In one or more embodiments, a network device is a type of computing device that executes computer instructions related to the operation of a network. In one or more embodiments, a network device may include a packet translation module. Additional details regarding the network device and packet translation module may be found in the description of FIG. 3.

In one or more embodiments, a source device (e.g., source device (230)) and a destination device (e.g., destination device (232)) are computing devices. A source device (230) may be configured (i.e., execute computer instructions) to generate a network packet (i.e., "packet") that is intended to be received by a destination device (232). Although FIG. 2 shows the source device (230) and destination device (232) as standalone devices within each local area network (200, 204), the source network device (210) may be the source device (230), and the destination network device (212) may be the destination device (232).

In one or more embodiments, a source network device (e.g., source network device (210)) is a network device and may include a source packet translation module (e.g., source packet translation module (220)). In one or more embodiments, a destination network device (e.g., destination network device (212)) is a network device and may include a destination packet translation module (e.g., destination packet translation module (222)). Additional details regarding the network device and packet translation module may be found in the description of FIG. 3.

While FIG. 2 shows a specific configuration of a system, other configurations may be used without departing from the scope. Accordingly, embodiments disclosed herein should not be limited to the configuration of devices and/or components shown in FIG. 2.

Figure 3:
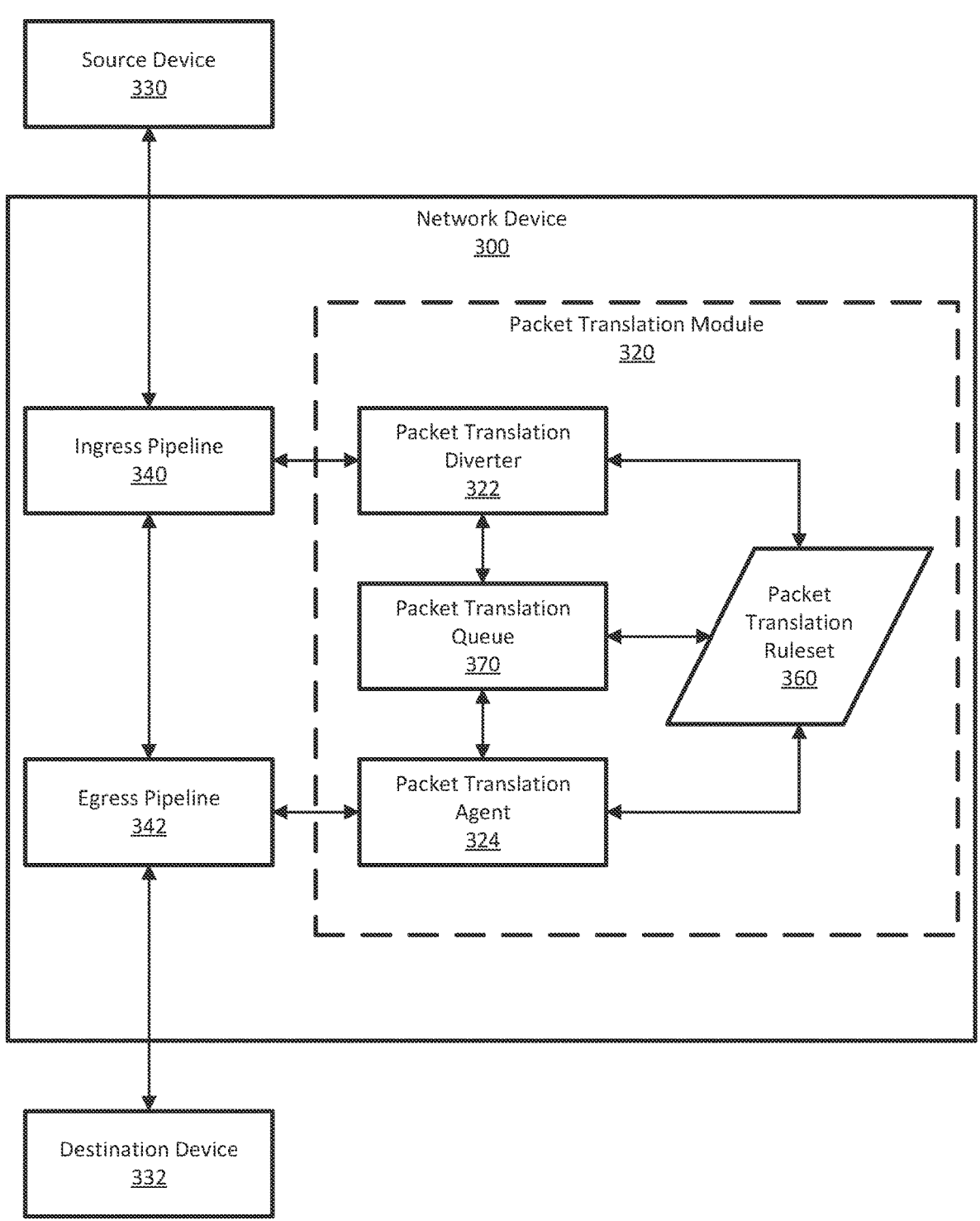
FIG. 3 shows a diagram of a network device, in accordance with one or more embodiments.

FIG. 3 shows a diagram of a network device, in accordance with one or more embodiments. A network device (e.g., network device (300)) may be connected to a source device (e.g., source device (330)) and a destination device (e.g., destination device (332)) either directly or through any number of computing devices (not shown) and networks (not shown) in between. Further, a network device (300) may include an ingress pipeline (e.g., ingress pipeline (340)), and egress pipeline (e.g., egress pipeline (342)), and a packet translation module (e.g., packet translation module (320)). Similarly named components, shown in this figure, have all of the same properties and functionalities as described in previous figures. Accordingly, only additional components, properties, and functionalities will be described below.

In one or more embodiments, an ingress pipeline (e.g., ingress pipeline (340)) is a data structure and queue (or collection of queues), stored in the memory of the network device (300), for buffering packets incoming to the network device (300). Further the ingress pipeline (340) may also be considered a software component (in addition to a queue) that includes a collection of computer instructions associated with managing the flow of the incoming packets. The ingress pipeline (340) may implement one or more policies of the network device (300) by executing specific computer code that dictates the handling of incoming packets (e.g., priority, where the packets are forwarded, etc.).

In one or more embodiments, an egress pipeline (e.g., egress pipeline (342)) is a data structure and queue (or collection of queues), stored in the memory of the network device (300), for buffering packets outgoing from the network device (300). Further the egress pipeline (342) may also be considered a software component (in addition to a queue) that includes a collection of computer instructions associated with managing the flow of the outgoing packets. The egress pipeline (342) may implement one or more policies of the network device (300) by executing specific computer code that dictates the handling of outgoing packets (e.g., priority, where the packets are forwarded, etc.).

In one or more embodiments, a packet translation module (e.g., packet translation module (320)) is a collection of software and data components that collectively perform the functions of packet address translation in the network device (300). A packet translation module (320) may include a packet translation diverter (322), a packet translation queue (370), a packet translation agent (324), and a packet translation ruleset (360). Each of these components is described below.

In one or more embodiments, a packet translation diverter (e.g., packet translation diverter (322)) is software, executing on the network device to redirect incoming packets that are identified to match the rule criteria of at least one rule of the packet translation ruleset (360). In one or more embodiments, the packet translation diverter (322) may be integrated into the operations of the ingress pipeline (340). As a non-limiting example, the computer code that includes the instructions to perform the operations of the packet translation diverter (322) may be executed (by a processor of the network device (300)) concurrently and/or within one or more operation(s) of the ingress pipeline (340). Accordingly, the packet translation diverter (322) may be logically considered a part (i.e., subprocess) of the ingress pipeline (340) and/or part of the packet translation module (320).

In one or more embodiments, a packet translation queue (e.g., packet translation queue (370)) is a data structure and queue, stored in the memory/storage of the network device (300), for buffering one or more packet(s) (not shown) diverted to the packet translation queue (370) by the packet translation diverter (322). Additional details regarding the packet translation queue (370) may be found in the description of FIG. 6.

In one or more embodiments, a packet translation agent (e.g., packet translation agent (324)) is software, executing on the network device to perform one or more operation(s) specified in the rule action(s) of a rule (of the packet translation ruleset (360)). In one or more embodiments, the packet translation agent (324) may be integrated into the operations of the egress pipeline (342). As a non-limiting example, the computer code that includes the instructions to perform the operations of the packet translation agent (324) may be executed (by a processor of the network device (300)) concurrently and/or within one or more operation(s) of the egress pipeline (342). Accordingly, the packet translation agent (324) may be logically considered a part (i.e., subprocess) of the egress pipeline (342) and/or part of the packet translation module (320).

In one or more embodiments, a packet translation ruleset (e.g., packet translation ruleset (360)) is a data structure, stored in the memory/storage of the network device (300), that includes one or more rule(s) (not shown). Additional details regarding the packet translation ruleset (360) may be found in the description of FIG. 4.

Although a packet translation module (320) is shown as having distinct software and data components, the software as stored and executed (by the network device (300)) may not be divided into such individually identifiable components. As a non-limiting example, the packet translation diverter (322) and packet translation agent (324) may be a single software instance that performs the operations of both components and holds the packet translation queue (370) and packet translation ruleset (360) in memory. One of ordinary skill in the art, having the benefit of this detailed description, would appreciate that various portions of software instances may be divided and/or combined and separately labeled to aid in the understanding of the function of the software.

In one or more embodiments, the components of the network device (300) may be implemented as hardware, software, data structures, or any combination thereof. Further, software (and "software components") may be computer instructions stored in generic memory and executed on a general-purpose processor, may be stored and executed on configurable hardware (e.g., a device that includes configurable logic gates, a field programmable gate array (FPGA), etc.), and/or may be stored and executed on specially designed hardware (e.g., an application specific integrated circuit (ASIC)). As a non-limiting example, the packet translation module (320) (with the ingress pipeline (340) and egress pipeline (342)) may be deployed on a single FPGA that is configured to perform the operations as described above. As another non-limiting example, the ingress pipeline (340) may be combined with the packet translation diverter (322) and executing as software (on a generic processor of the network device (300)), the egress pipeline (342) may be executing on an ASIC, while the packet translation queue (370) may be manipulated on a dedicated memory device of the network device (300). One of ordinary skill in the art, having the benefit of this detailed description, would appreciate that any combination of hardware and software may be utilized to employ the components of the network device (300).

While FIG. 3 shows a specific configuration of a system, other configurations may be used without departing from the scope. Accordingly, embodiments disclosed herein should not be limited to the configuration of devices and/or components shown in FIG. 3.

Figure 4:
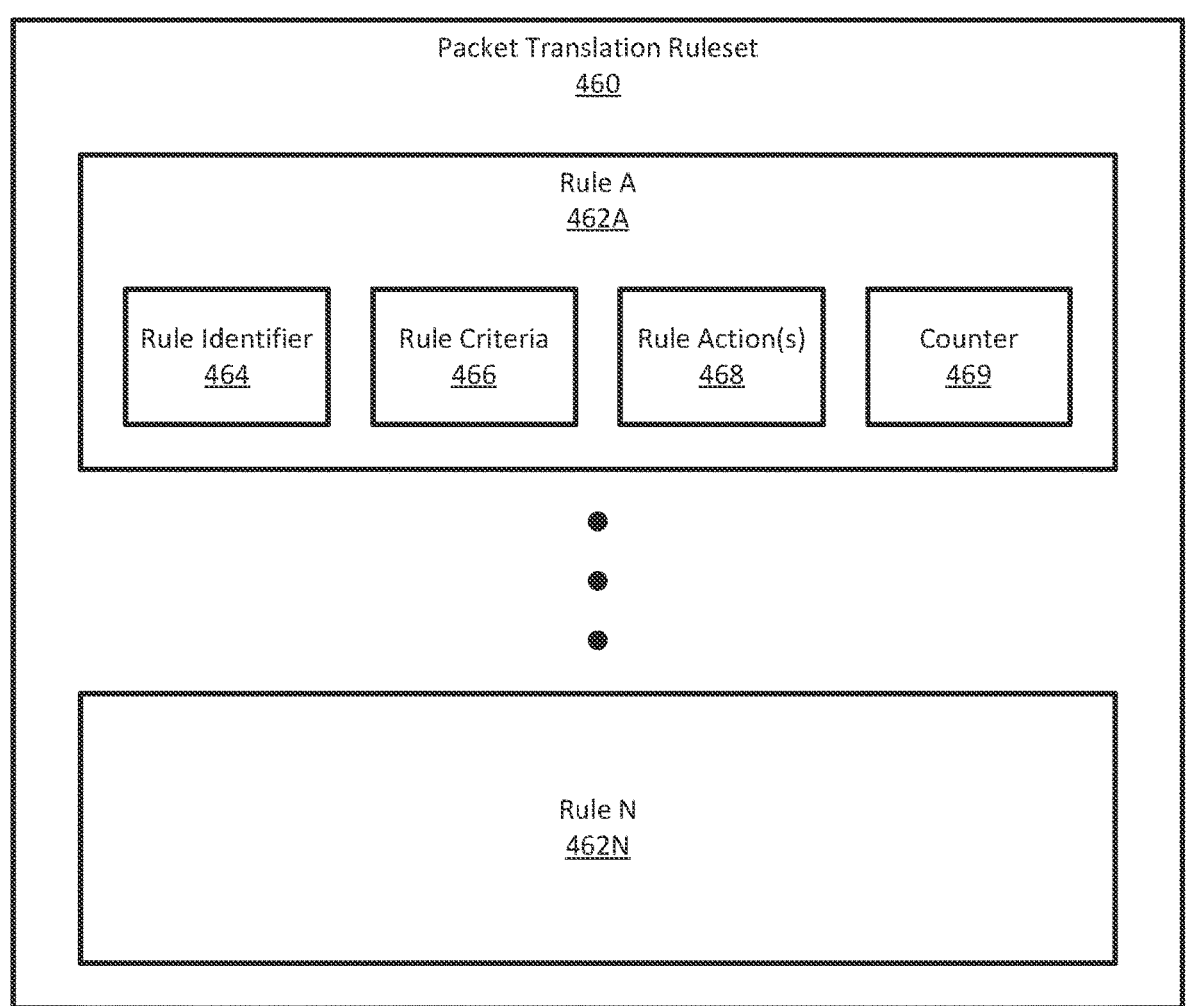
FIG. 4 shows a diagram of packet translation ruleset, in accordance with one or more embodiments.

FIG. 4 shows a diagram of packet translation ruleset, in accordance with one or more embodiments. In one or more embodiments, a packet translation ruleset (packet translation ruleset (460)) is a data structure, stored in the memory/storage of the network device (300), that includes one or more rule(s) (e.g., rule A (462A), rule N (462N)), described below.

In one or more embodiments, a rule (e.g., rule A (462A), rule N (462N)) is a data structure that includes data relevant to the applicability and execution of a network policy. A rule (462A, 462N) may be created, partially or wholly, by a user (not shown) of the network device and/or the rule (462A, 462N) may be created, partially or wholly, by software of the network device. Further, a rule (462A, 462N) may include a rule identifier (e.g., rule identifier (464)), rule criteria (e.g., rule criteria (466)), one or more rule action(s) (e.g., rule action(s) (468)), and a counter (e.g., counter (469)). Each of these components is described below.

In one or more embodiments, a rule identifier (e.g., rule identifier (464)) is an alphanumeric expression associated with a rule (462A, 462N). The alphanumeric expression may be encoded using a standard protocol for alphanumeric characters (e.g., Unicode, American Standard Code for Information Interchange (ASCII), etc.). In one embodiment, the rule identifier (464) is provided by a user that initiated the creation of the corresponding rule (462A, 462N) and may further be a string of text that uniquely identifies that rule (462A, 462N) to one or more users (e.g., "mapping 4", "engineering", "sales east", etc.). In one embodiment, a rule identifier (464) may be automatically generated by the network device when the rule (462A, 462N) is created. Further, a rule identifier (464) may be a simple integer count (e.g., 1, 2, 3, 4, 5, etc.) or index (e.g., 0, 1, 2, 3, etc.). One of ordinary skill in the art, having the benefit of this detailed description, would appreciate that a rule identifier may be any alphanumeric expression that identifies an associated set of rule(s).

In one or more embodiments, a rule criterion (e.g., rule criteria (466)) is data that specifies a packet property and an associated value (or range of values). As a non-imitating example, a single rule criterion (466) may specify a property of "source MAC address" with an associated value "18:65: 71:A0:ED:00". Accordingly, the criteria of a matching packet would be a packet with a source MAC address of 18:65:71:A0:ED:00.

In one or more embodiments, rule criteria (466) may specify multiple packet properties, multiple corresponding associated values, and one or more logical operators linking the multiple properties. As another non-limiting example, a first property may be "source IP address" with an associated value of "10.10.5.0/24". Further, a second property may be "destination MAC address" with an associated value "18: 65:71:A0:ED:00". Continuing with the example, the logical operator linking the two properties may be "AND". Accordingly, the criteria of a matching packet would be a packet with a source IP address anywhere in the range 10.10.5.0-255 and with a destination MAC address of 18:65:71:A0: ED:00.

Non-limiting examples of packet properties include a source/sender IP address, a destination/recipient IP address, source/sender MAC address, a destination/recipient MAC address, layer 4 source/sender port, layer 4 destination/ recipient port, and ethernet protocol type.

One of ordinary skill in the art, having the benefit of this detailed description, would appreciate that various combinations of packet properties, associated values, and logical operators may be used to generate simple, complicated, broad, or narrow sets of rule criteria.

In one or more embodiments, a rule action (e.g., rule action(s) (468)) is data that specifies a modification to make to the packet data of a packet (and/or a copy of the packet). Further, a rule action (468) may specify generating a certain number of copies of the packet and the modifications to make to the packet data of the copied packet(s), respectively. A rule action (468) may include a rule action identifier (an alphanumeric string, not shown) that is uniquely associated with the rule action (468). If a rule action (468) specifies generating multiple copies of a packet, a unique rule action identifier may be generated for each copy of the packet generated.

As a non-limiting example, rule actions (468) may include steps to: (1) generate two copies of a packet, (2) set the destination IP address of the first copied packet to "172.217.22.14", (3) set the destination IP address of the second copied packet to "54.239.28.85". Further, the rule action (468) includes two unique rule action identifiers (one for each packet).

Non-limiting examples of packet data that may be modified include a source/sender IP address, a destination/recipient IP address, source/sender MAC address, a destination/recipient MAC address, layer 4 source/sender port, layer 4 destination/recipient port, ethernet protocol type, layer 4 checksum value.

In one or more embodiments, a counter (e.g., counter (469)) is a numerical indication of how many copies of an associated packet have yet to be sent to an egress pipeline. As a non-limiting example, a counter (469) may have a value of "2", meaning that two copies of the packet need to be generated and sent to an egress pipeline. Further, after one of those copies is sent to the egress pipeline, the counter (469) may be decremented to "1" indicating that only one copy of the packet now needs to be generated and sent to an egress pipeline.

While FIG. 4 shows a specific configuration of a system, other configurations may be used without departing from the scope. Accordingly, embodiments disclosed herein should not be limited to the configuration of devices and/or components shown in FIG. 4.

FIG. 5 shows an example of a packet translation ruleset, in accordance with one or more embodiments. The example packet translation ruleset (560) includes a series of rules (rule A (562A), rule B (562B), rule C (562C), rule D (562D), rule E (562E)) each with a corresponding rule identifier (564), rule criteria (566), and rule action(s) (568).

Each rule (562A-E) in the example packet translation ruleset (560) of FIG. 5 is used in a corresponding example figure (see FIGS. 8-12 for an example implementation of each example rule (562A-E)).

While FIG. 5 shows a specific configuration of a system, other configurations may be used without departing from the scope. Accordingly, embodiments disclosed herein should not be limited to the configuration of devices and/or components shown in FIG. 5.

Figure 6:
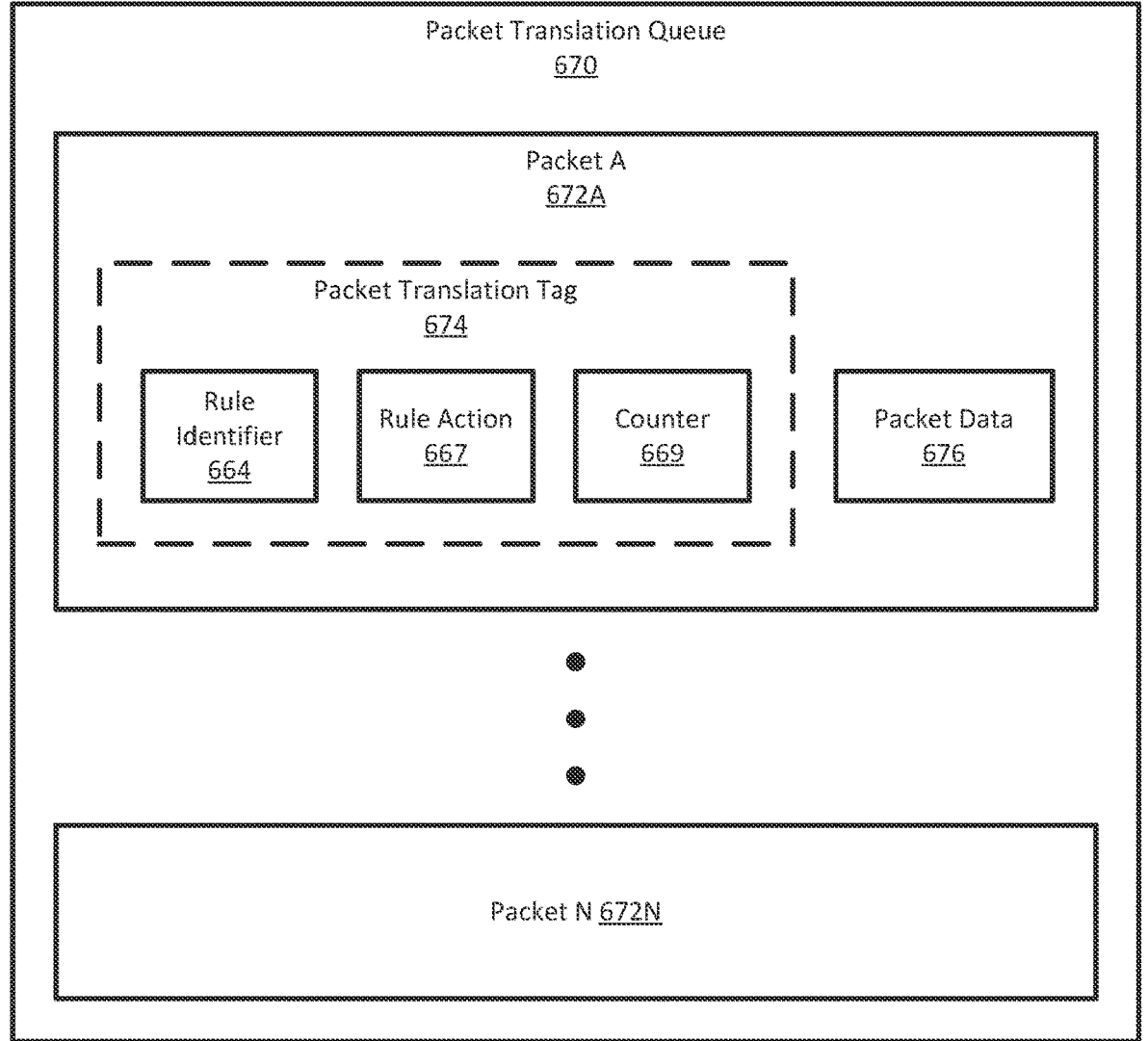
FIG. 6 shows a diagram of a packet translation queue, in accordance with one or more embodiments.

FIG. 6 shows a diagram of a packet translation queue, in accordance with one or more embodiments. In one or more embodiments, a packet translation queue (packet translation queue (670)) is a data structure, stored in the memory/storage of the network device, that includes one or more packet(s) (e.g., packet A (672A), packet N (672N)) diverted to the packet translation queue (670) by the packet translation diverter. Further, a packet (672A, 672N) may include a packet translation tag (e.g., packet translation tag (674)) and packet data (e.g., packet data (676)). Similarly named components, shown in this figure, have all of the same properties and functionalities as described in previous figures. Accordingly, only additional components, properties, and functionalities will be described below.

In one or more embodiments, a packet (e.g., packet A (672A), packet N (672N)) is data that may include a packet translation tag (674) and packet data (676). Each of these components is described below.

In one or more embodiments, packet data (e.g., packet data (676)) is the data included in the packet as received by the ingress pipeline (i.e., prior to the addition of the packet translation tag (674)). Packet data (676) may include a packet header (including, for example, a source/sender IP address, a destination/recipient IP address), source/sender MAC address, a destination/recipient MAC address, layer 4 source/sender port, layer 4 destination/recipient port, ethernet protocol type, layer 4 checksum value, payload, error correction, options, flags, or any combination thereof. A packet may also include additional data and is not limited by the specifically enumerated preceding data components. Further, as used herein, any part or combination of parts of the packet data (676) may be referred to as a "portion of the packet" or a "portion of the packet data".

In one or more embodiments, a packet translation tag (e.g., packet translation tag (674)) is a collection of data copied from a matching rule. Specifically, a packet translation tag (674) may include a rule identifier (664), a rule action (667), a counter (669), or any combination thereof. A packet translation tag (674) may be added to the header of a packet (672A, 672N), added to a new section of the packet, or various parts of the packet translation tag (674) (e.g., the counter (669)) may be added to the header of a packet, whereas other parts (e.g., the rule identifier (664)) may be added separately elsewhere in the packet.

While FIG. 6 shows a specific configuration of a system, other configurations may be used without departing from the scope. Accordingly, embodiments disclosed herein should not be limited to the configuration of devices and/or components shown in FIG. 6.

Figure 7A:
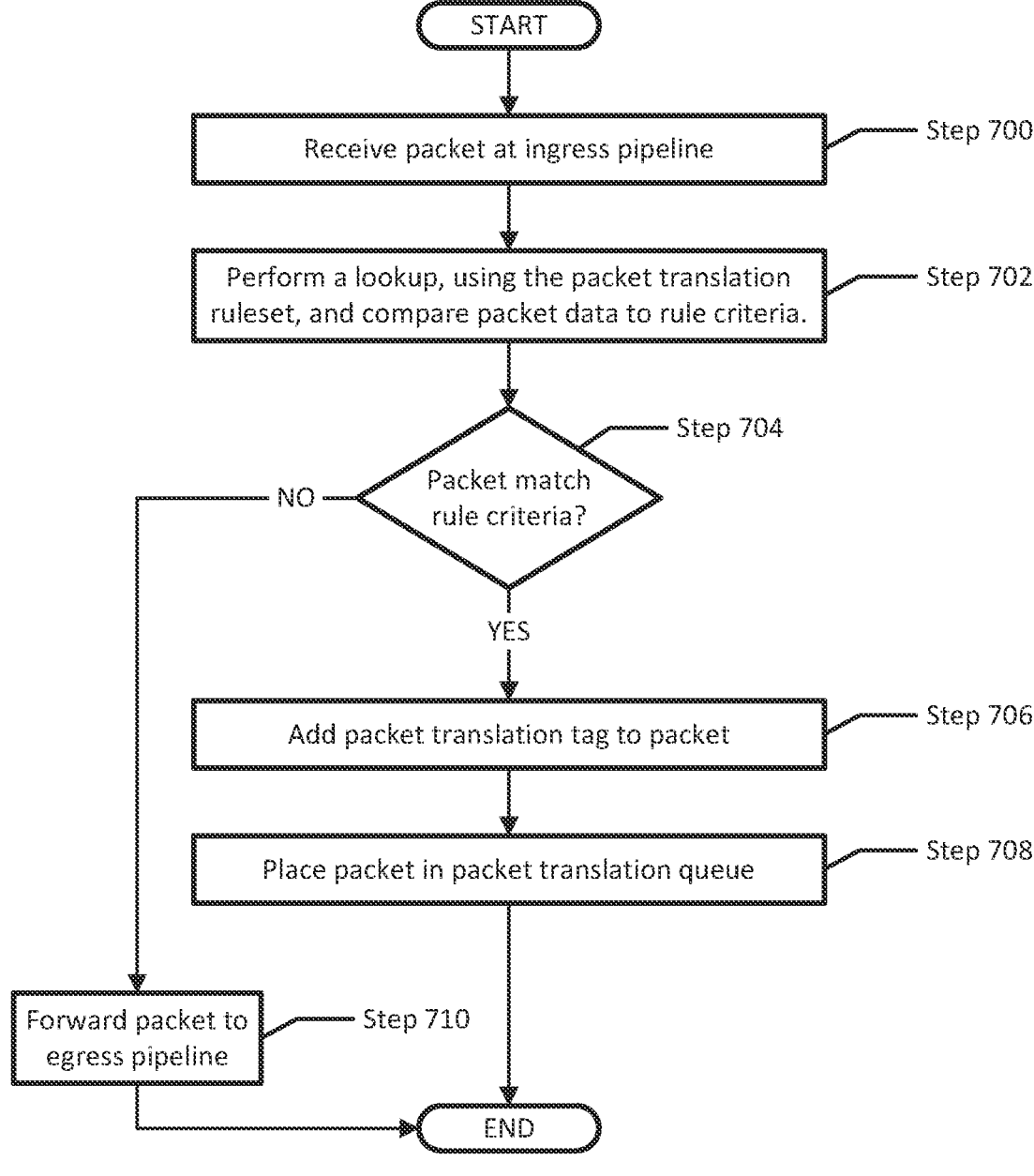
FIG. 7A shows a flowchart of a method of diverting a network packet, in accordance with one or more embodiments.

FIG. 7A shows a flowchart of a method of diverting a network packet, in accordance with one or more embodiments. All or a portion of the method shown in FIG. 7A may be performed by one or more components of a network device (and/or a packet translation module thereof). However, another component of the system may perform this method without departing from the scope. While the various steps in this flowchart are presented and described sequentially, one of ordinary skill in the relevant art will appreciate that some or all of the steps may be executed in different orders, may be combined or omitted, and some or all steps may be executed in parallel.

In Step 700, a packet is received at an ingress pipeline in a network device. In one or more embodiments, the packet may have been generated by a source device prior to Step 700 and the ingress pipeline may receive the packet from the source device (directly or indirectly).

In Step 702, a packet translation diverter performs a lookup, using the packet translation ruleset, and compares the packet data of the packet to the rule criteria of each rule.

In Step 704, a determination is made if the packet data matches the rule criteria of any one of the rules in the packet translation ruleset. If the packet data matches any rule criteria (704—YES), the process proceeds to Step 706. If the packet data does not match the rule criteria (704—NO), the process proceeds to Step 710.

In Step 706, the packet translation diverter adds a packet translation tag to the packet. In one or more embodiments, the packet translation tag includes the rule identifier, rule action(s), and/or counter associated with the rule that included the matching rule criteria in Step 704. A packet translation tag may be added to the header of a packet, added to a new section of the packet, or various parts of the packet translation tag (e.g., the counter) may be added to the header of a packet, whereas other parts (e.g., the rule identifier) may be added separately elsewhere in the packet (e.g., in the packet data).

In Step 708, the packet translation diverter places (i.e., diverts) the packet into the packet translation queue. After the packet is placed into the packet translation queue, the ingress portion of the process may conclude.

In Step 710, the packet translation diverter forwards the packet to the egress pipeline. In one or more embodiments, a packet that does not have packet data matching any rule criteria is processed normally (and not diverted into the packet translation queue). After the packet is forwarded to the egress pipeline, the ingress portion of the process may conclude.

Figure 7B:
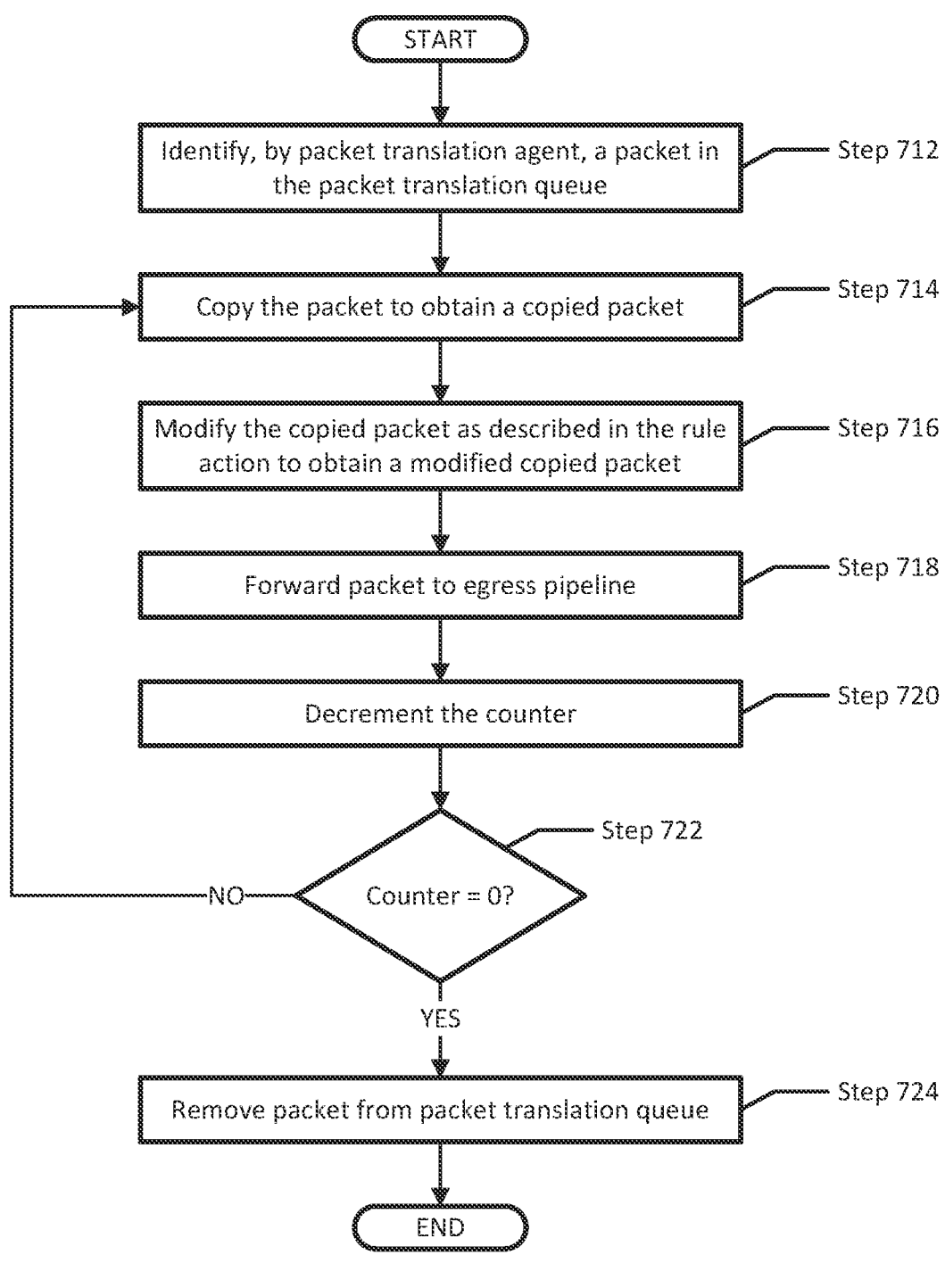
FIG. 7B shows a flowchart of a method of copying and modifying a network packet, in accordance with one or more embodiments.

FIG. 7B shows a flowchart of a method of copying and modifying a network packet, in accordance with one or more embodiments. All or a portion of the method shown in FIG. 7B may be performed by one or more components of a network device (and/or a packet translation module thereof). However, another component of the system may perform this method without departing from the scope. While the various steps in this flowchart are presented and described sequentially, one of ordinary skill in the relevant art will appreciate that some or all of the steps may be executed in different orders, may be combined or omitted, and some or all steps may be executed in parallel.

In Step 712, a packet translation agent identifies the existence of the packet in the packet translation queue. In one or more embodiments, the packet translation agent may periodically check the packet translation queue for the existence of packets using a scheduler. If the packet translation agent does not identify any packets when checking the packet translation queue, the packet translation agent idles until the next scheduled event to check the packet translation queue.

In Step 714 the packet translation agent copies the packet in the packet translation queue (identified in Step 712) to obtain a copied packet. Further, in one or more embodiments, the packet translation agent adds the rule action identifier (from the rule action) to the copied packet for the specific copy of the packet being modified. As a non-limiting example, if two copies of the packet are to be generated, each copy of the packet has a unique rule action identifier added that is specific to the actions to be performed on that one specific copy. In one or more embodiments, the copied packet may reside in the packet translation queue, the egress pipeline, or in another data structure.

In one or more embodiments, the entire packet may not be copied. Instead, just the header of the packet may be copied to obtain a copied header (including the source and destination IP addresses). In such an instance, the packet translation agent adds the rule action identifier (from the rule action) to the copied header for the specific copy of the packet being modified. As a non-limiting example, if two copies of the packet are to be generated, each copy of the header has a unique rule action identifier added that is specific to the actions to be performed on that one specific copy.

In Step 716, the translation packet agent modifies the copied packet data (and/or header) of the packet as specified in the action rule(s) for the matching rule to obtain a modified copied packet. In one or more embodiments, where only the header was copied at Step 714, the modified copied header may be merged with the packet in the packet translation queue (without ever copying the packet itself) to obtain the modified copied packet. In one or more embodiments, where there is more than one copy of the packet to be made, the translation packet agent performs the actions associated with the rule action identifier that is unique to that particular copied packet (as the rule may include several rule actions that are unique to different packet copies). In one or more embodiments, any of the packet data, after it has been modified may be considered "modified packet data" (e.g., a "modified source IP address", a "modified destination MAC address", a "modified egress port", etc.).

In Step 718, the packet translation agent forwards the modified copied packet to the appropriate egress pipeline. In one or more embodiments, the egress pipeline may be specified by a rule action in the packet translation tag.

In Step 720, the packet translation agent decrements the counter of the packet in the packet translation queue. In one or more embodiments, decrementing the counter includes subtracting 1 (i.e., −1) from the current value of the counter.

In Step 722, the packet translation agent makes a determination if the counter is equal to 0. If the counter is equal to 0 (722—YES), the process may proceed to Step 724. However, if the counter is not equal to 0 (722-NO), the process returns to Step 714. In one or more embodiments, the counter may not have a value of "0", but instead may otherwise indicate that additional copies of the packet need to be sent (722—YES), or that additional copies of the packet do not need to be sent (722—NO).

In Step 724, the packet translation agent removes the packet from the packet translation queue. Following removal of the packet from the packet translation queue, the egress portion of the handling of that packet may conclude.

Figure 8:
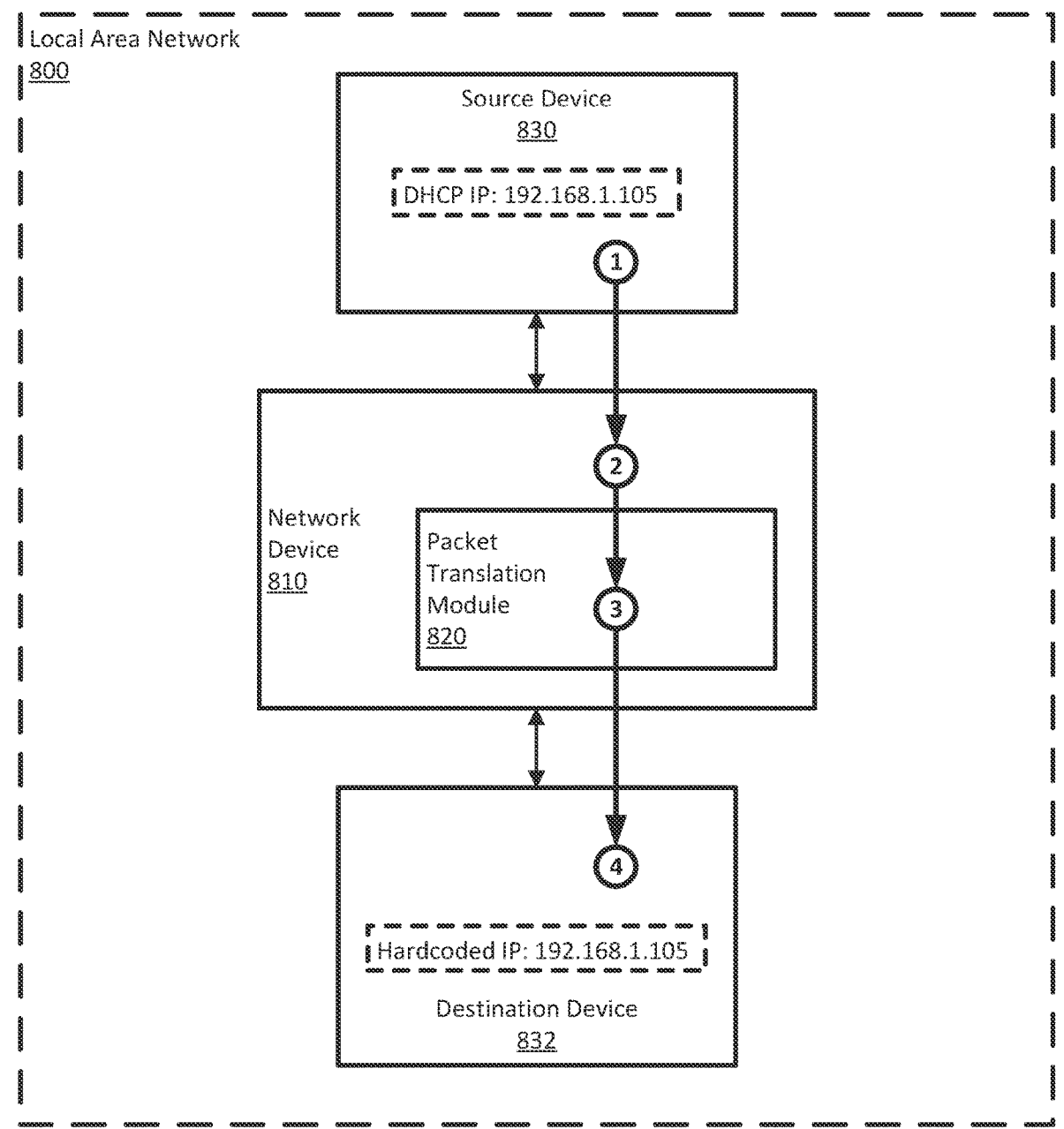
FIG. 8 shows an example, in accordance with one or more embodiments.

FIG. 8 shows an example, in accordance with one or more embodiments. The following use case is for explanatory purposes only and not intended to limit the scope to this embodiment. In FIG. 8, consider a scenario in which a source device (830) has a dynamic host configuration protocol (DHCP) assigned IP address of 192.168.1.105, yet also on the network is a destination device (832) that has the same hardcoded IP address of 192.168.1.105. Normally, such a configuration would not be able to exist (causing IP address conflicts in the local area network (800)).

However, the destination device (832) is not directly connected to the source device (830) (or other devices (not shown)) in the local area network (800). Instead, the destination device (832) is shielded from other devices in the local area network (800) by the network device (810) and the packet translation module (820) therein.

Further, the packet translation module (820) includes a packet translation ruleset with Rule A (562A) (rule identifier "0") as shown in FIG. 5. The rule criteria specify any packet with a destination of 192.168.10.105/32 and the rule action includes a step to (1) change the destination address to 192.168.1.105/32 for any packet that matches the rule criteria. Accordingly, within the local area network (800), all computing devices see the destination device (832) as having the IP address 192.168.10.105 (despite it actually being 192.168.1.105). That is, even though the destination device (832) has the hardcoded IP address of 192.168.1.105, the source device (830) (and every other computing device (not shown) connected to the local area network (800)) uses IP address 192.168.10.105 for the destination device (832). As explained in the example steps below, the network device (810) isolates the destination device (832) from every other computing device of the local area network (800) and the packet translation module (820) modifies incoming packets (addressed to 192.168.10.105) to use the destination device's (832) actual IP address of 192.168.1.105.

At (1), source device (830) generates a packet with destination address 192.168.10.105. The packet is then routed normally and sent over the local area network (800).

At (2), the packet arrives at network device (810) (through which all traffic destined to IP address 192.168.10.105 is routed). The translation packet diverter (of network device (810)) identifies a match for the packet with the rule "0" because the packet is addressed to 192.168.10.105—and the rule criteria specifies that anything addressed to the IP address 192.168.10.105/32 satisfies the conditions of the rule criteria. Accordingly, the packet is diverted into the packet translation queue of the packet translation module (820).

At (3), the packet, now in the packet translation queue, is copied and modified by the translation packet agent (of packet translation module (820)) to change the destination address from 192.168.10.105 to 192.168.1.105 (the rule action specified in the rule). After this modification is made, the packet is forwarded to the egress pipeline of network device (810) and routed normally to destination device (832).

At (4), the packet is received at the destination device (832) and the destination device (832) accepts that packet as the destination address is 192.168.1.105.

As a variation of the shown example, consider a scenario where two or more packet translation modules are stationed between two or more destination devices with hard coded IP addresses. In such a scenario, the packet translation modules may each (independently) perform the function of modifying packets to facilitate communication with the legacy devices. Additionally, two or more packet translation modules may be used for load balancing and fault tolerance.

Figure 9:
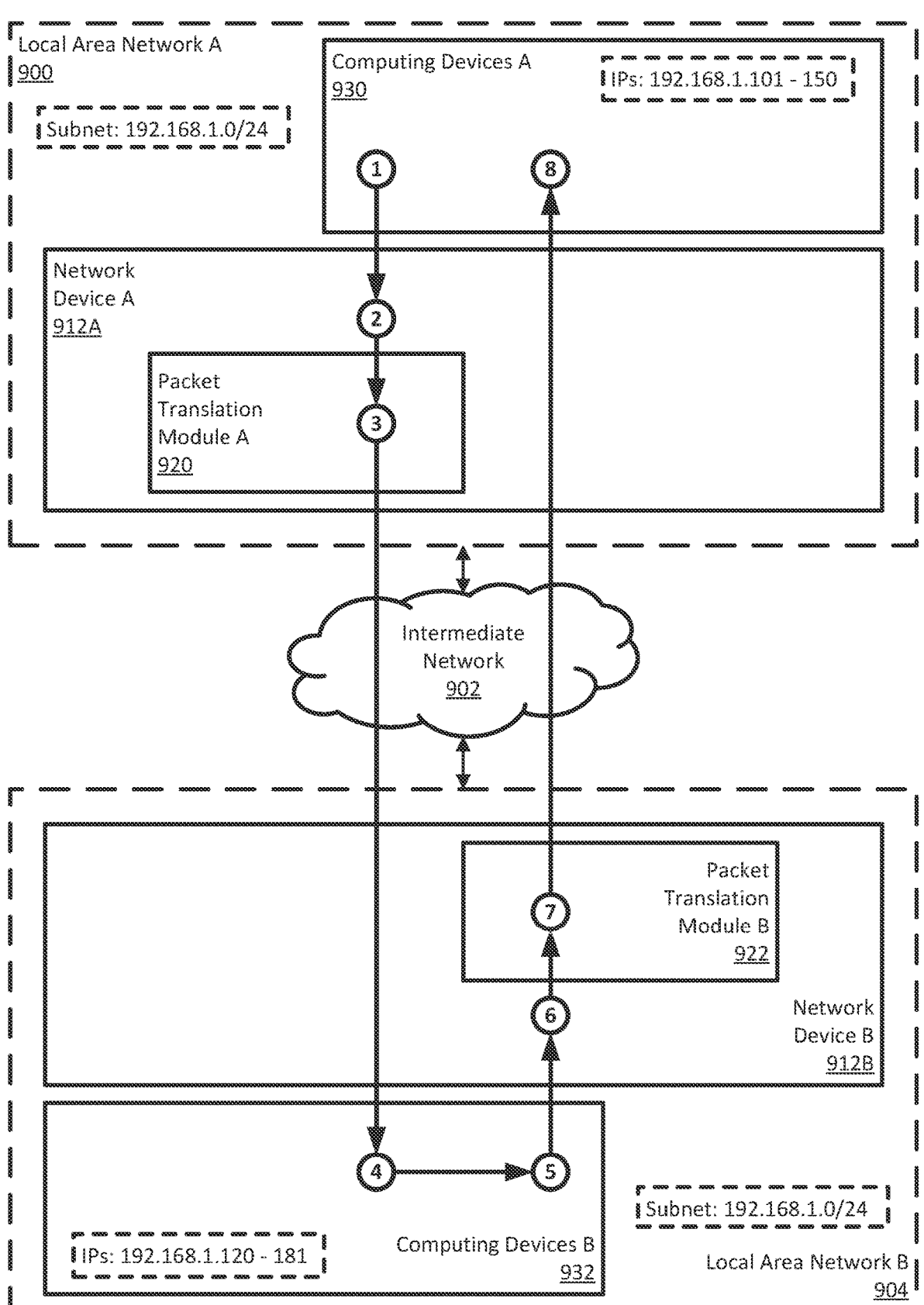
FIG. 9 shows an example, in accordance with one or more embodiments.

FIG. 9 shows an example, in accordance with one or more embodiments. The following use case is for explanatory purposes only and not intended to limit the scope to this embodiment. In FIG. 9, consider a scenario in which, local area network A (900) and local area network B (904) have the same subnet (192.168.1.0/24, with a DHCP server issuing addresses in the range 192.168.1.0-255). Further, computing devices A (930) includes devices with IP addresses from 192.168.1.101-150 while computing devices B includes devices with IP addresses from 192.168.1.120-181.

In this example, 31 devices in each network (62 devices total) have the same IP address as a device in the other network (overlapping IP addresses 192.168.1.120-150). Normally, directly merging two such networks (900, 904) over intermediate network (902) would cause numerous IP address conflicts and prevent most network traffic. However, by utilizing two packet translation modules (packet translation module A (920) and packet translation module B (922)) both networks can be virtually joined.

Specifically, packet translation module A (920) includes a packet translation ruleset with Rule B (562B) ("SITE_A_2_SITE_B") as shown in FIG. 5. The rule criteria specify any packet with a destination subnet of 192.168.20.0/24 and the rule action(s) include steps to (1) change the destination subnet to 192.168.1.0/24, and (2) change source subnet to 192.168.10.0/24.

Further, packet translation module B (922) includes a packet translation ruleset with Rule C (562C) ("SITE_B_2_SITE_A") as shown in FIG. 5. The rule criteria specify any packet with a destination subnet of 192.168.10.0/24 and the rule action(s) include steps to (1) change destination subnet to 192.168.1.0/24, and (2) change source subnet to 192.168.20.0/24.

Accordingly, within local area network A (900), all computing devices in local area network B (904) appear to have the subnet 192.168.20.xx. And, conversely, within local area network B (904), all computing devices in local area network A (900) appear to have the subnet 192.168.10.xx, thereby avoiding all IP address conflicts.

At (1), a computing device with IP address 192.168.1.121 (of local area network A (900)) generates a ping packet. The source address of the ping packet is 192.168.1.121 and the destination address is 192.168.20.142. The ping packet is routed normally to network device A (912A)

At (2), the translation packet diverter (of packet translation module A (920)) identifies a match for the ping packet with the rule "SITE_A_2_SITE_B" because the ping packet is addressed to 192.168.20.142—and the rule criteria specifies that anything addressed to the subnet 192.168.20.0/24 satisfies the conditions of the rule criteria. Accordingly, the ping packet is diverted into the packet translation queue.

At (3), the packet, now in the packet translation queue, is copied and modified by the translation packet agent (of packet translation module A (920)) to change the destination address from 192.168.20.142 to 192.168.1.142, and the source address from 192.168.1.121 to 192.168.10.121 (the two rule actions specified in the rule). After these modifications are made, the packet is forwarded to the egress pipeline of network device A (912A) and routed normally to computing devices B (932).

At (4), the ping packet is received at the computing device with the IP address 192.168.1.142 (of local area network B (904)). At (5), the computing device, with the IP address 192.168.1.142 (of local area network B (904)) generates a reply packet in response to the ping packet. The reply packet is generated with source address 192.168.1.142, and addressed to 192.168.10.121 (the IP address listed as the original sender of the ping packet). The reply packet is then forwarded normally within local area network B (904) to network device B (912B).

At (6), the translation packet diverter (of packet translation module B (922)) identifies a match for the ping packet with the rule "SITE_B_2_SITE_A" because the ping packet is addressed to 192.168.10.121—and the rule criteria specifies that anything addressed to the subnet 192.168.10.0/24 satisfies the conditions of the rule criteria. Accordingly, the ping packet is diverted into the packet translation queue.

At (7), the packet, now in the packet translation queue, is copied and modified by the translation packet agent (of packet translation module B (922)) to change the destination address from 192.168.10.121 to 192.168.1.121, and the source address from 192.168.1.142 to 192.168.20.142 (the two rule actions specified in the rule). After these modifications are made, the packet is forwarded to the egress pipeline of network device B (912B) and routed normally to computing devices A (930).

At (8), the computing device with IP address 192.168.1.121 (of local area network A (900)) receives the reply packet. The original ping packet (generated at (1)) has a source IP address of 192.168.1.121 and a destination IP address of 192.168.20.142. Accordingly, the computing device with IP address 192.168.1.121 is configured to expect a reply packet that is oppositely addressed—with source IP address 192.168.20.142 and destination IP address 192.168.1.121. As modified in step (7), the computing device with IP address 192.168.1.121 receives the reply packet addressed as expected.

Although the example shown in FIG. 9 only shows two local area networks (900, 904), the described method and technologies may be employed over any number of networks. Further, one or more packet translation modules may be employed even when the IP address ranges of two networks do not overlap/conflict. As a non-limiting example, consider the layout of FIG. 9 (or FIG. 2) where one or more addresses of the intermediate network conflicts with the addresses of one of the local area networks (while the addresses of two local area networks do not conflict). In such an instance, one or more packet translation module(s) may be employed to modify network traffic to avoid conflicting with the network devices of the intermediate network.

As another non-limiting example, consider a scenario with three local area networks, where each of those three networks may employ a packet translation module to arbitrarily modify all traffic to the other local area networks (either with or without overlapping IP addresses). Continuing with the example, a first network's packet translation module may modify all traffic to (and from) a second network as appearing to belong to subnet 10.1.2.0/24 (regardless of the second network's actual addressing scheme). Further, that same first network's packet translation module may modify all traffic to (and from) a third network as appearing to belong to subnet 10.1.3.0/24 (regardless of the second network's actual addressing scheme). By arbitrarily forcing such traffic into the desired address ranges, it may be easier to implement and manage separate policies for devices of those external networks (e.g., firewalls, permissions, quality of service, throttling, etc.).

Further, continuing with the same example, the second network's packet translation module may force all traffic to (and from) the first network and third network into the same subnet as the devices of the second network. This may be desired for opposite reasons—using the same policies that already exist within the second network for the devices of the first and third networks.

Lastly, continuing with the same example, the third network may modify some of the traffic from the first network to unique subnet (e.g., 172.16.12.0/24), may modify other traffic from the first network to the same subnet as the third network (e.g., 192.168.85.0/24), while leaving other traffic from the first network unmodified (e.g., in subnet 10.1.1.0/24). Similarly, any number of rules may be applied for traffic to (and from) the second network.

Figure 10:
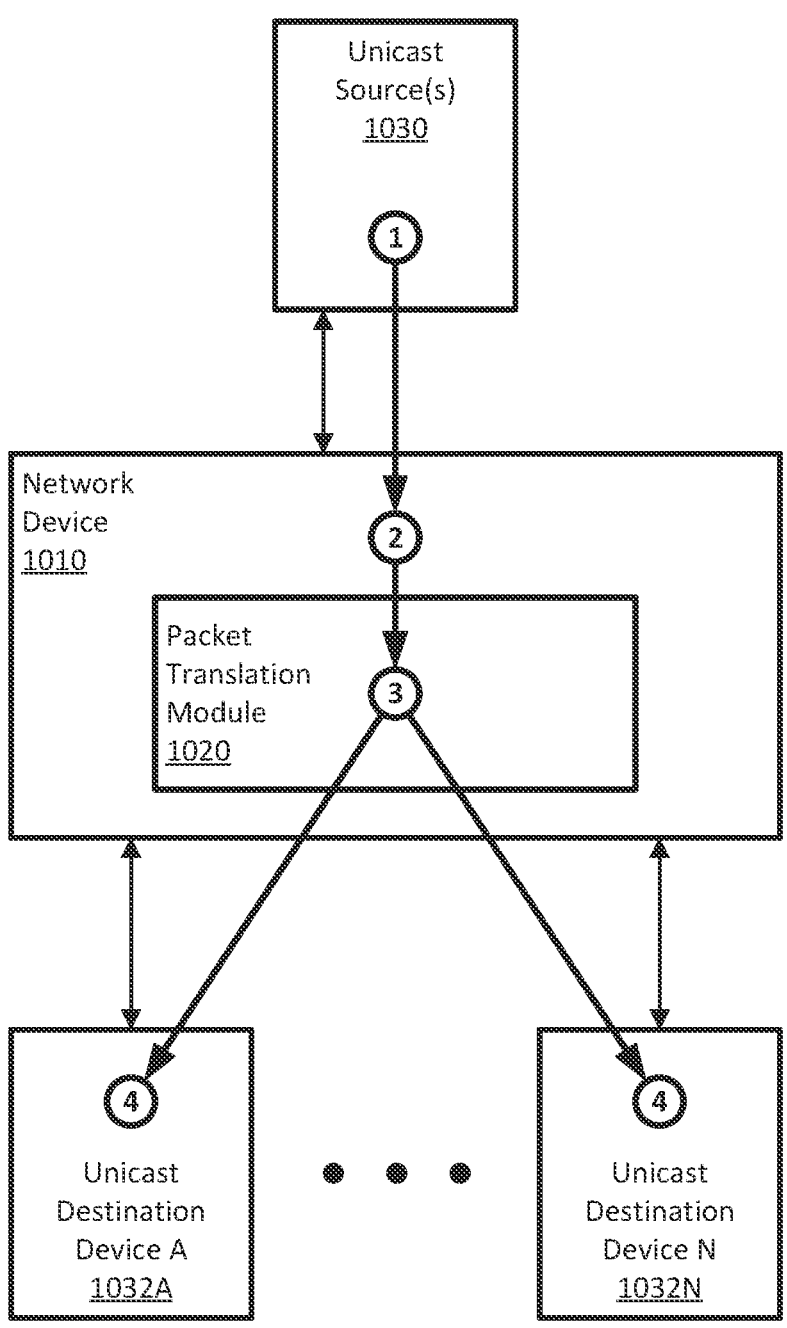
FIG. 10 shows an example, in accordance with one or more embodiments.

FIG. 10 shows an example, in accordance with one or more embodiments. The following use case is for explanatory purposes only and not intended to limit the scope to this embodiment. In FIG. 10, consider a scenario in which it is desired that unicast source(s) (1030) broadcast the same unicast stream to multiple unicast destination devices (unicast destination device A (1032A), unicast destination device N (1032N)). Although not shown in FIG. 10, there could be any number of intermediary networks between each of the devices depicted.

At (1), one or more unicast source(s) (1030) begins to broadcast a single unicast stream from IP address 162.32.45.99 to the network device (1010) at IP address 97.125.25.16. At (2), the translation packet diverter (of network device (1010)) identifies a match for the unicast stream with the rule "Uni2MultiUni" because the unicast stream is from source IP address 162.32.45.99 and being sent to destination IP address 97.125.25.16—satisfying Rule D (562D) of FIG. 5.

At (3), the packet, now in the packet translation queue, is copied a first time and modified by the translation packet agent (of packet translation module (1020)) to change the destination address from 97.125.25.16 to 192.168.10.54 as specified in the rule action for the first copy of the packet.

Additionally, a second copy of the packet is produced, and modified by the translation packet agent (of packet translation module (1020)) to change the destination address from 97.125.25.16 to 192.168.10.57. Further, the source IP address is changed from 162.32.45.99 to 100.88.36.2 as specified in the rule action for the second copy of the packet. After these modifications are made, the packets are forwarded to the egress pipeline of network device (1010) and routed normally to the unicast destination devices (1032A, 1032N). Alternatively, after the first copied packet is modified, the first modified copied packet may be sent prior to generating the second copied packet.

At (4), the first modified copied packet is received by the unicast destination device A (1032A) with IP address 192.168.10.54. Additionally, the second modified copied packet is received by the unicast destination device N (1032N) with IP address 192.168.10.57. Further, neither recipient destination device (1032A, 1032N) of the unicast stream is aware that the stream was duplicated by a packet translation module (1020) during transit. Further, the source IP address of the unicast stream received by unicast destination device N (1032N) is changed (from 162.32.45.99 to 100.88.36.2) to hide the real source IP address of the unicast source (1030).

Figure 11:
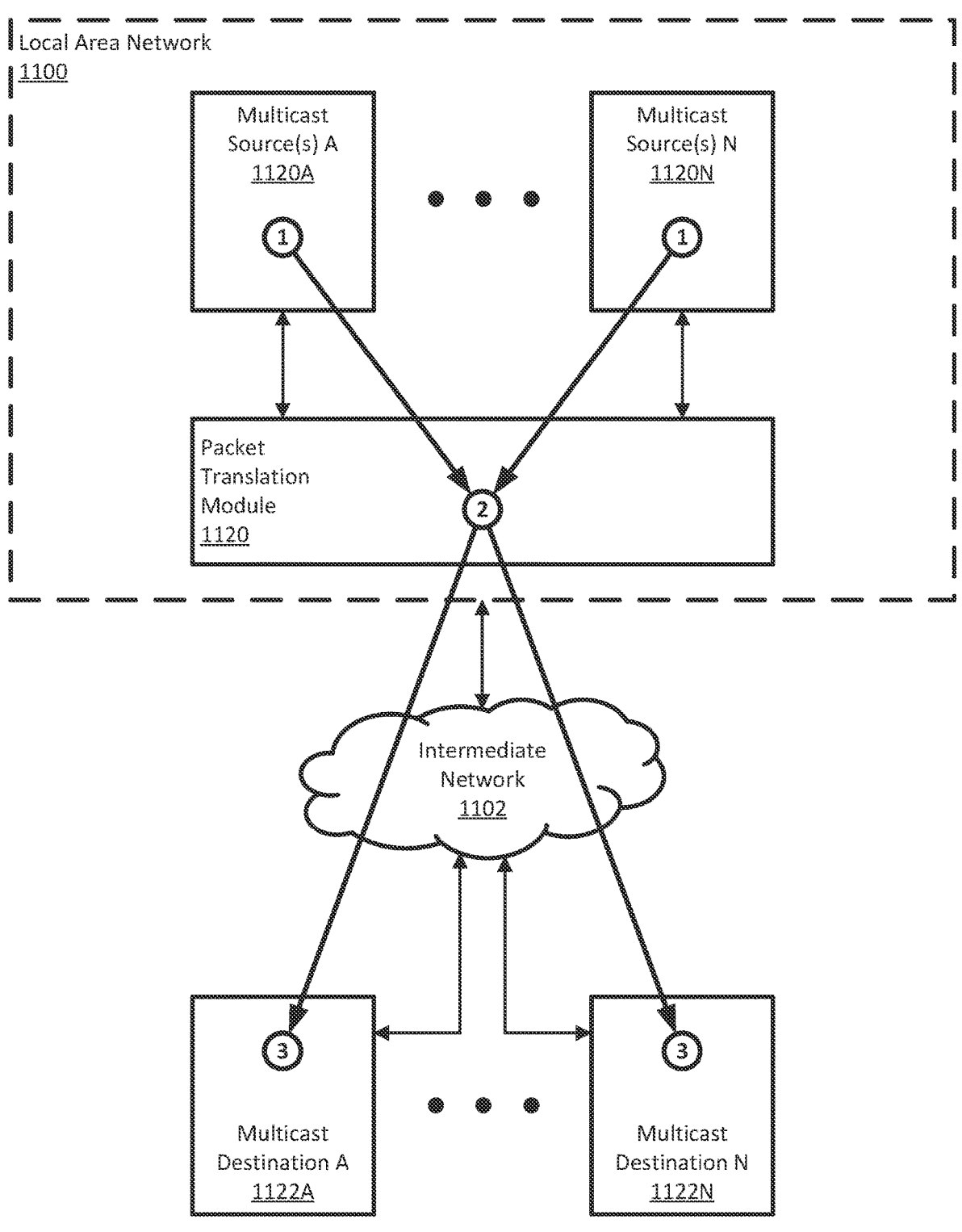
FIG. 11 shows an example, in accordance with one or more embodiments.

FIG. 11 shows an example, in accordance with one or more embodiments. The following use case is for explanatory purposes only and not intended to limit the scope to this embodiment. In FIG. 11, the network device that includes the packet translation module (1120) is excluded for compactness and to reduce repetitiveness of the procedure. In FIG. 11, consider a scenario in which within a local area network (1100), multiple multicast sources (multicast source A (1120A), multicast source B (1120B)) are generating multiple multicast streams. But, instead of providing several multicast streams externally, it is desired to provide a single unified multicast frontend over the intermediate network (1102).

At (1), one or more multicast source(s) (1120A, 1120B) begins to broadcast multiple multicast streams to the network device (not shown) with the packet translation module (1120). Multicast source A (1120A) is broadcasting to destination group IP address 239.55.55.55, whereas multicast source B (1120B) is broadcasting to destination group IP address 240.21.99.2 (both of which are received by the packet translation module (1120)).

At (2), the translation packet diverter (of the packet translation module (1120)) identifies a match for the unicast stream with the rule "UnifiedMulti" because the multicast streams are sent to destination IP address 239.55.55.55 and 240.21.99.2—either of which satisfies Rule E (562E) of FIG. 5. Accordingly, the multicast stream packets are then placed in the packet translation queue.

As specified in the rule actions for Rule E (562E) of FIG. 5, the source IP address is changed to 77.10.10.2 for all packets. However, for the first copy of each packet, the destination group IP address is changed to 239.10.10.2 (for multicast destination A (1122A)). And, for the second copy of each packet, the destination group IP address is changed to 239.10.10.3 (for multicast destination N (1122N)).

After these modifications are made, the packets are forwarded to the egress pipeline of the network device and routed normally to multicast destinations (1122A, 1122N) over intermediate network (1102). Alternatively, after the first copied packet is modified, the first modified copied packet may be sent prior to generating the second copied packet.

Further, although not shown in Rule E of FIG. 5, the rule may additionally specify to send each copied stream to a unique egress port of the network device (that includes packet translation module (1120)). Accordingly, each multicast destination (1122A, 1122N) accesses their copy of the multicast stream from a unique egress port (possibly unaware of the other port's existence).

At (3), the first modified copied packet is received by the multicast destination A (1122A) with group IP address 239.10.10.2. Additionally, the second modified copied packet is received by the multicast destination N (1122N)

with group IP address 239.10.10.3. Further, neither recipient of the multicast stream is aware that the stream was either (i) merged from multiple sources (1120A, 1120N) or (ii) split into multiple streams by a packet translation module (1120) during transit, as it appears there is a single multicast frontend (from source group address 77.10.10.2).

Further, this process may be reversed where multiple external multicast streams are funneled through a single packet translation module (or multiple packet translation modules configured to work in parallel) to provide a unified frontend for the multicast streams within the local area network.

Figure 12:
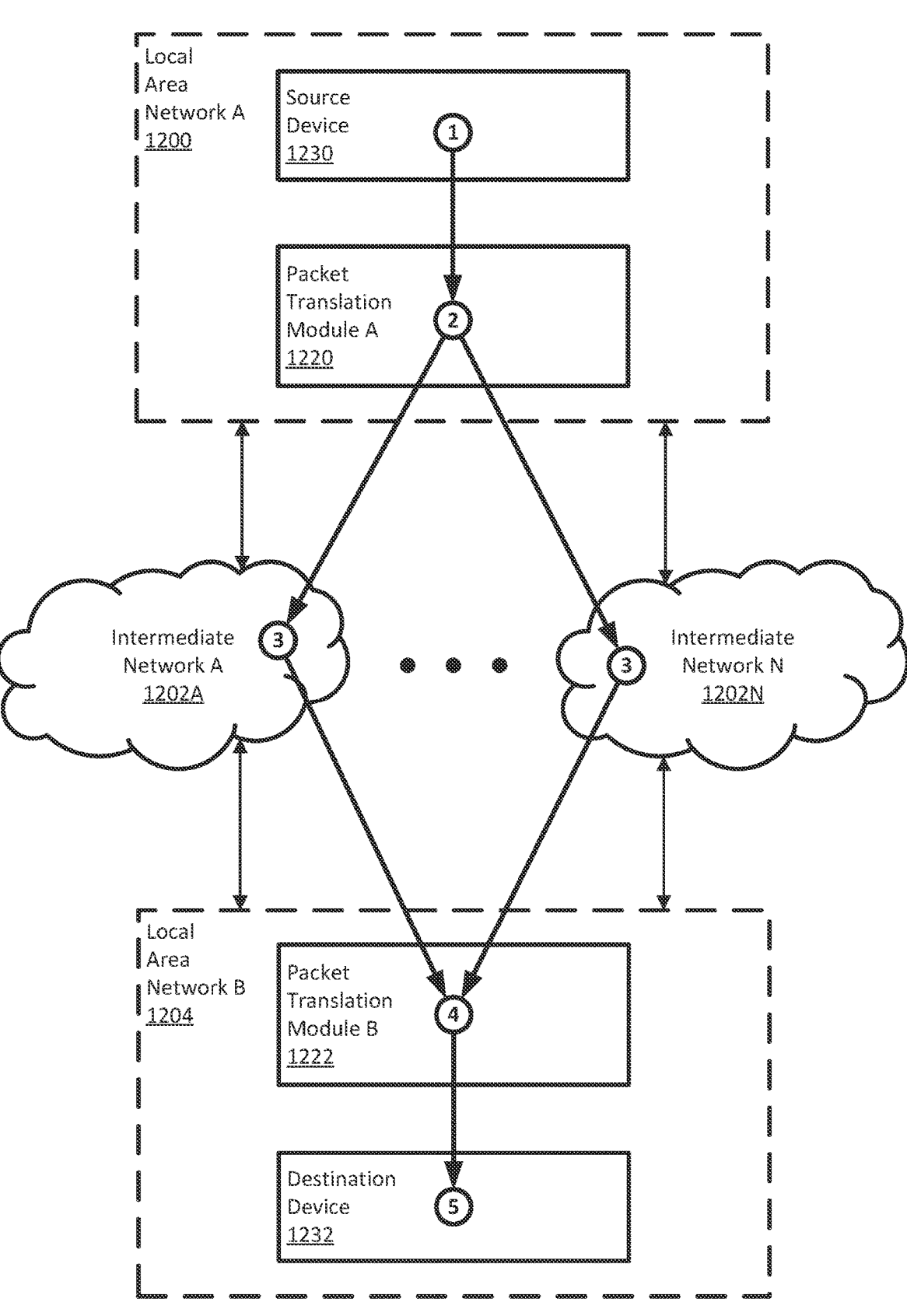
FIG. 12 shows an example, in accordance with one or more embodiments.

FIG. 12 shows an example, in accordance with one or more embodiments. The following use case is for explanatory purposes only and not intended to limit the scope to this embodiment. In FIG. 12, consider a scenario in which a source device (1230) broadcasts a multicast stream to (at least) one destination device (1232). Further, the multicast stream (as initially generated) is not compatible with one or more intermediate networks (1202A, 1202N) between the source device (1230) and the destination device (1232). Further, as shown, there are multiple paths from local area network A (1200) to local area network B (1204) —either through intermediate network A (1202A) or through intermediate network N (1202N). Such a setup may be desirable if redundancy is important to maintain the stream of data from the source device (1230) to the destination device (1232).

Accordingly, at (1), the source device (1230) begins to broadcast a multicast stream from IP address 192.168.1.10 to destination group IP address 239.10.10.10. At (2), the network device (not shown) with packet translation module A (1220) (in local area network A (1200)) receives the multicast stream and generates two copies of the stream, modifies each copy to a unicast stream packet (compatible to be transmitted over the intermediate networks (1202A, 1202N)), and with a different modified destination IP address on each of the stream (i.e., all of the first copies have the same modified destination IP address, and all of the second copies have the same modified destination IP address).

Accordingly, at (3), each of the unicast streams is directed over different intermediate networks (1202A, 1202N) before arriving at local area network B (1204). Further, at (4), the two unicast streams are re-merged by packet translation module B (1222) and converted back into multicast stream packets. Accordingly, a single multicast stream frontend is presented to the destination device (1232) inside local area network B (1204). Thus, at (5), the destination device (1232) does not need to manage either or both of the multicast streams. Instead, every aspect of the duplication, conversion, and merging of the streams occurs without the intervention of the destination device (1232) by the packet translation modules (1220, 1222).

As articulated above, specific embodiments are described with reference to the accompanying figures. In the preceding description, numerous details were set forth as examples. One of ordinary skill in the art, having the benefit of this detailed description, would appreciate that one or more embodiments described above may be practiced without the explicitly articulated details, and that numerous variations or modifications may be possible without departing from the scope. Certain details known to those of ordinary skill in the art may be omitted to avoid obscuring the description.

In the preceding description of the figures, any component described with regard to a figure, in various embodiments, may be equivalent to one or more like-named components shown and/or described with regard to any other figure. For brevity, descriptions of these components were not repeated with regard to each figure. Thus, each and every embodiment of the components of each figure is incorporated by reference and assumed to be optionally present within every other figure having one or more like-named components. Additionally, in accordance with various embodiments, any description of any component of a figure is to be interpreted as an optional embodiment, which may be implemented in addition to, in conjunction with, or in place of the embodiments described with regard to a corresponding like-named component in any other figure.

Throughout this application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term 'connected', or 'connection', means that there exists between elements/components/devices a direct or indirect connection that allows the elements to interact with one another in some way (e.g., via the exchange of information). For example, the phrase 'connected' may refer to any direct (e.g., wired connection or wireless connection directly between two devices) or indirect (e.g., wired and/or wireless connections between any number of devices connecting the connected devices) connection.

As used herein, the adjectives "source", "destination", and "intermediate" are for explanatory purposes only. That is, the components, devices, and collections of devices described using these adjectives are meant only to provide a better understanding to the reader in the context of a particular scenario—not to generally limit the capabilities of those components, devices, and collections of devices. As an example, a "component" may perform certain operations when acting as a "source component" and may perform some of the same and other operations when acting as a "destination component". However, each "component" (whether it be "source" or "destination") may be fully capable of performing the operations of either role.

While one or more embodiments have been described herein with respect to a limited number of embodiments and examples, one of ordinary skill in the art, having the benefit of this detailed description, would appreciate that other embodiments can be devised which do not depart from the scope of the embodiments disclosed herein. Accordingly, the scope should be limited only by the attached claims.

What is claimed is:

1. A method for modifying packet data of a packet in a network device, wherein the method comprises:
    receiving, at an ingress pipeline of the network device, the packet;
    performing a lookup, in a packet translation ruleset, to compare the packet data to rule criteria of a rule in the packet translation ruleset, the rule associated with a rule action;
    making a first determination that at least a first portion of the packet data matches the rule criteria; and based on the first determination:

adding a packet translation tag to the packet, wherein the packet translation tag added to the packet comprises the rule action associated with the matching rule associated with the matching rule criteria, wherein the rule action describes a modification to perform on the packet;

creating a copy of the packet by copying the packet translation tag comprising the rule action and at least a second portion of the packet data to obtain the copied packet;

modifying the copied packet according to the modification as described in the rule action included in the packet translation tag of the copied packet to obtain a modified copied packet; and forwarding the modified copied packet to an egress pipeline.

2. The method of claim 1, wherein modifying the copied packet comprises:

changing a destination IP address of the packet to a modified destination IP address.

3. The method of claim 2, wherein modifying the copied packet further comprises:

changing a source IP address of the packet to a modified source IP address.

4. The method of claim 3, wherein the source IP address and the destination IP address belong to a same first subnet.

5. The method of claim 4, wherein the modified source IP address and the modified destination IP address do not belong to a same second subnet.

6. The method of claim 1, wherein after adding the packet translation tag to the packet and before copying the packet, the method further comprises:

placing the packet in a packet translation queue.

7. The method of claim 6, wherein after placing the packet in the packet translation queue, the method further comprises:

identifying the packet in the packet translation queue.

8. The method of claim 1, wherein the method further comprises:

decrementing a counter of the packet translation tag; and making a second determination, that the counter indicates a second copy of the packet needs to be sent.

9. The method of claim 8, wherein, based on the second determination, the method further comprises:

copying the packet translation tag and the second portion of the packet data to obtain a second copied packet, wherein the packet translation tag comprises a second rule action;

modifying the second copied packet as described in the second rule action to obtain a second modified copied packet; and forwarding the second modified copied packet to the egress pipeline.

10. The method of claim 9, wherein the rule action specifies a first modified destination IP address, wherein the second rule action specifies a second modified destination IP address, wherein the first modified destination IP address and the second modified destination IP address are different.

11. The method of claim 9, wherein the method further comprises:

wherein after forwarding the modified copied packet to the egress pipeline:

the modified copied packet is routed through a first intermediate network, and wherein after forwarding the second modified copied packet to the egress pipeline:

the second modified copied packet is routed through a second intermediate network.

12. The method of claim 11, wherein modifying the copied packet as described in the rule action, comprises:

changing a protocol of the copied packet from unicast to multicast.

13. The method of claim 9, wherein a protocol of the packet is unicast.

14. The method of claim 1, wherein the method further comprises:

receiving, at the ingress pipeline of the network device, a second packet;

performing a second lookup, in the packet translation ruleset, to compare second packet data of the second packet to second rule criteria of the rule in the packet translation ruleset;

making a second determination that at least a first portion of the second packet data matches the rule criteria; and based on the second determination:

adding a second packet translation tag to the second packet, wherein the second packet translation tag comprises a second rule action associated with the rule associated with the matching rule criteria;

copying the second packet translation tag and at least a second portion of the second packet data to obtain a second copied packet;

modifying the second copied packet as described in the second rule action to obtain a second modified copied packet; and forwarding the second modified copied packet to the egress pipeline.

15. The method of claim 14, wherein the method further comprises:

wherein modifying the copied packet comprises:

changing a source IP address of the packet to a modified source IP address, and wherein modifying the second copied packet comprises:

changing a second source IP address of the second packet to the modified source IP address, wherein the source IP address and the second source IP address are different.

16. A network device, comprising:

an ingress pipeline;

an egress pipeline;

a packet translation module, comprising:

a packet translation diverter;

a packet translation agent;

a packet translation queue;

a packet translation ruleset;

a processor, executing the packet translation diverter, performs a method for modifying packet data of a packet, wherein the method comprises:

receiving, at the ingress pipeline, the packet;

performing a lookup, in the packet translation ruleset, to compare the packet data to rule criteria of a rule in the packet translation ruleset, the rule associated with a rule action;

making a first determination that at least a portion of the packet data matches the rule criteria; and based on the first determination:

adding a packet translation tag to the packet, wherein the packet translation tag added to the packet comprises the rule action associated with the matching rule associated with the matching rule criteria, wherein the rule action describes a modification to perform on the packet;

wherein the processor, executing the packet translation agent, performs the method for modifying the packet data of the packet, wherein the method further comprises:

creating a copy of the packet by copying the packet translation tag comprising the rule action and at least a second portion of the packet data to obtain the copied packet;

modifying the copied packet according to the modification as described in the rule action included in the packet translation tag of the copied packet to obtain a modified copied packet; and forwarding the modified copied packet to the egress pipeline.

17. The network device of claim 16, wherein modifying the copied packet comprises:

changing a destination IP address of the packet to a modified destination IP address.

18. The network device of claim 17, wherein modifying the copied packet further comprises:

changing a source IP address of the packet to a modified source IP address.

19. The network device of claim 18, wherein the source IP address and the destination IP address belong to a same first subnet.

20. The network device of claim 19, wherein the modified source IP address and the modified destination IP address do not belong to a same second subnet.

* * * * *